Figure 1:
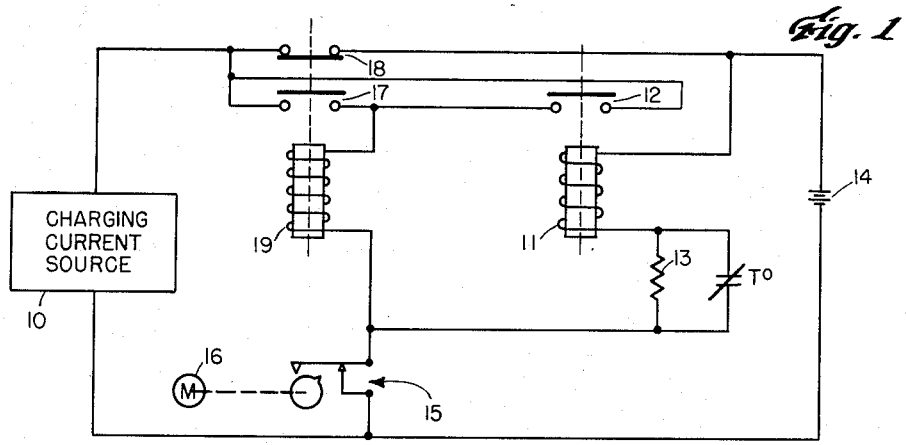

Nov. 15, 1955  C. A. CADY  2,724,084
CONTROL APPARATUS FOR BATTERY CHARGERS
Filed Sept. 3, 1954

Charles A. Cady
Inventor
by W. R. Hulbert
Attorney

United States Patent Office 2,724,084
Patented Nov. 15, 1955

2,724,084

CONTROL APPARATUS FOR BATTERY CHARGERS

Charles A. Cady, Wayland, Mass., assignor of one-half to Harold S. Bird, Belmont, Mass.

Application September 3, 1954, Serial No. 453,995

11 Claims. (Cl. 320—34)

This invention relates generally to battery charging and more particularly to control apparatus associated with battery chargers.

It is a well known fact that chargeable storage batteries lose an appreciable amount of their charge when allowed to remain idle for long periods of time. Consequently, it has been found desirable to provide apparatus for automatically maintaining an inactive battery in a fully charged state, as well as for replenishing energy actually supplied by an active battery. Although control apparatus to perform this function is in itself not new, heretofore known devices have required the use of relatively sensitive voltage measuring elements. For example, one of the simplest devices known to the art consists essentially of a relay adapted to turn the charging current on or off in accordance with the battery voltage. Since the change in the battery voltage with loss of charge is relatively small, however, the "drop-out" voltage of the relay must be fixed within very narrow limits so that charging may take place at the proper time, namely, before the battery has lost an appreciable amount of its charge. Also, the "pull-in" voltage of the relay should be substantially equal to the voltage which represents a fully charged state of the battery or otherwise the battery will be either undercharged or overcharged, the latter condition producing gassing and loss of battery electrolyte. Because of these facts, a precision type relay whose "pull-in" and "drop-out" voltages are accurately specified and not subject to change is generally required making the cost of the apparatus much higher than need be otherwise. Even when such precision type relay is utilized, a further problem arises from the fact that the "pull-in" and "drop-out" voltages of the relay generally cannot be made to differ by more than ten percent or so. Hence charging must be either initiated or discontinued at a time which is not the most advantageous from the standpoint of the state of charge of the battery.

It is an object of this invention, therefore, to provide relatively inexpensive battery charger control apparatus.

It is another object of this invention to provide battery charger control apparatus responsive to the increase in voltage of a battery when subject to an applied charging current.

It is a further object of this invention to provide battery charger control apparatus wherein loss of battery electrolyte through gassing is minimized.

It is a still further object of this invention to provide battery charger control apparatus which prevents overcharging of a battery.

The manner in which the foregoing objects are accomplished relates to the characteristics of storage batteries when a charging current is applied to them. Specifically, a substantially fully charged battery which has been idle but for a short time has a terminal voltage which increases rather rapidly during the initial stages of charging. A discharged storage battery, on the other hand, has a terminal voltage which increases very slowly when placed under charge. According to this invention, therefore, relatively simple apparatus is provided which, in effect, takes advantage of the difference in the average slope of the voltage-time characteristics of charged and discharged batteries subjected to a charging current. If it appears that the battery is substantially fully charged by virtue of a relatively rapid increase in its voltage, there is provided an inexpensive relay-type element which will interrupt the charging current within a short time. In this way, unnecessary charging of the battery with attendant gassing is avoided. Since gassing of the battery is generally accompanied by loss of battery electrolyte, operation according to this invention is particularly desirable where the battery serves as a standby source of electrical energy which is seldom used and which is generally unattended. If, on the other hand, it appears that the battery has lost an appreciable amount of charge by virtue of the battery voltage failing to attain a prescribed value within a relatively short time, interruption of the charging current takes place only after the battery reaches a substantially fully charged state.

Figure 2:
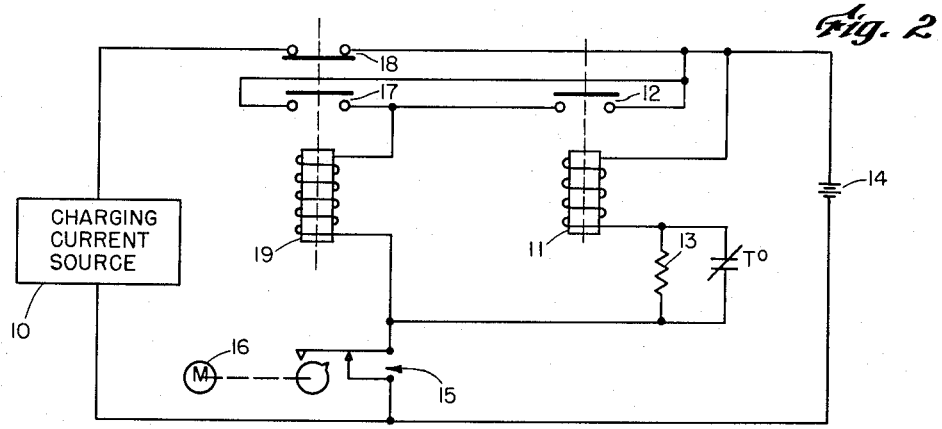
Figure 3:
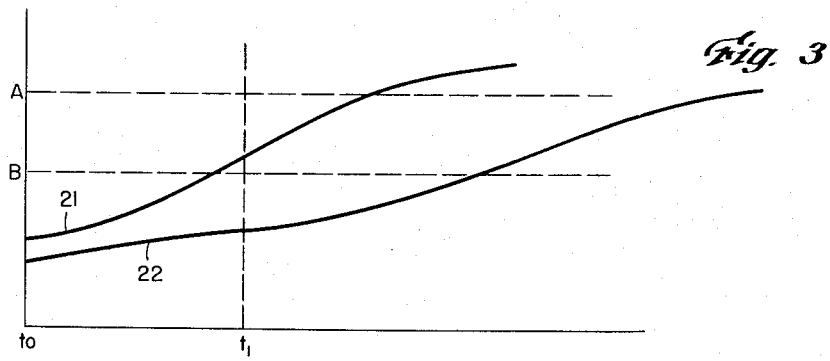

The novel features of this invention together with further objects and advantages thereof will become more readily apparent when considered in connection with the accompanying drawing, in which:

Fig. 1 is a schematic diagram of the battery charger control circuit of this invention, Fig. 2 is a schematic diagram of a modification of the control circuit in accordance with this invention, and Fig. 3 is a graph illustrating the voltage-time characteristics of substantially charged and discharged batteries to which a charging current has been applied.

Referring now to Fig. 1, it will be observed that the control apparatus of this invention includes a first relay having a coil 11 and a pair of contacts 12 which are open when coil 11 is deenergized. Coil 11 is connected in series with a resistor 13, and the series combination of coil 11 and resistor 13 are in turn connected to a battery 14 by means of a switch 15. Switch 15 is ordinarily closed, but is adapted to open momentarily upon the expiration of successive time intervals of uniform duration. To this end, switch 15 is operated by a motor 16, the combination of switch 15 and motor 16 comprising a conventional type of cycle timer which is readily available commercially. Shunting resistor 13 is a pair of contacts T⁰ associated with another time operated switch, contacts T⁰ being adapted to open after a predetermined time delay as will be explained more fully hereinafter. Finally there is provided a second relay or contactor having a pair of normally open contacts 17, and a pair of normally closed contacts 18 both actuated by a coil 19. Contacts 18 connect battery 14 to a source of charging current 10 only when coil 19 is deenergized, whereas contacts 17 provide an operative connection only when coil 19 is energized. Specifically, contacts 17 are connected between source 10 and one leg of coil 19 as are contacts 12. To complete this circuit the other leg of coil 19 is connected to source 10 through switch 15. Hence, when switch 15 is closed, and contacts 17 are closed by virtue of coil 19 being energized, coil 19 is directly coupled across source 10. Coil 11, on the other hand, is coupled to battery 14 directly, when switch 15 and switch T⁰ are closed, and is coupled to battery 14 indirectly through resistor 13 when switch T⁰ is open.

Coil 11, which closes contacts 12 when in an energized condition is of the voltage sensitive type. In other words, when a voltage of sufficient magnitude is impressed across coil 11, it closes contacts 12, thereby connecting coil 19 to source 10 through switch 15. Since battery 14 is coupled directly to coil 11, when contacts T⁰ are closed, the condition of contacts 12 will be dependent only on the battery voltage in this case. When contacts T⁰ open, however, the condition of contacts 12 will be dependent on the size of resistor 13 as well as the battery voltage. Accordingly, after a predetermined time when contacts T⁰ open, a higher battery voltage will be required to actuate contacts 12 because of the voltage drop across resistor 13.

Contacts T⁰ may be delayed in their opening in any well known way, such as with an interval timer utilizing an electric clock type motor. Alternatively, a spring wound timing device or other delayed action type switch may be used if desired. Either of these may be energized directly from the battery 14 or connected to a source of alternating current, not shown, it being apparent that any relatively inexpensive timing device is suitable.

In operation, assuming switch 15 has momentarily opened and then closed to begin the cycle, the voltage of battery 14 will be impressed directly across coil 11, switch T⁰ being initially closed thereby short-circuiting resistor 11. Provided that the magnitude of the battery voltage is insufficient to energize coil 11 and to actuate contacts 12, contacts 12 remain open and coil 19 remains deenergized. Hence, contacts 18 associated with coil 19 are closed permitting charging current to flow from source 10 to battery 14 in order to restore its charge.

With reference to Fig. 3, it will be observed that when the charging current begins to flow through battery 12, its terminal voltage increases. Curve 21 illustrates the time-voltage characteristic of a conventional wet storage battery, if the battery is substantially fully charged to begin with, whereas curve 22 illustrates the way in which the voltage increases when the battery is initially partially discharged. Time $t_0$ in this figure connotes the start of the charging operation and $t_1$ denotes the time subsequent to $t_0$ when contacts T⁰ open, that is when the predetermined period of time has expired. A significant difference between curves 21 and 22 is that in the range $t_0$ to $t_1$ the average slope of curve 21 is much greater than the average slope of curve 22. Since the voltage necessary to actuate contacts 12, is dependent only on the battery voltage in the range of time $t_0$ to $t_1$, it is apparent that in the case of a substantially fully charged battery a predetermined voltage value B will be readily attained. In the case of a discharged battery, however, the voltage will not even approach this value by time $t_1$. Therefore by providing a relatively simple relay having a coil 11 adapted to actuate contacts 12 when a voltage approximately equal to B is applied thereto, contacts 12 will be caused to close energizing coil 19, and opening contacts 18 so as to interrupt the flow of charging current through the battery 12 if battery 12 was initially substantially fully charged. If battery 12 was not substantially fully charged initially, however, voltage B will not be attained within the period of time $t_0$ to $t_1$. At time $t_1$, then, contacts T⁰ will open placing resistor 11 in series with coil 11 so that a higher voltage of battery 12 must be reached in order to actuate contacts 12. Accordingly, in the case where battery 14 has lost a good deal of its charge before the charging current is initiated, the charging current will continue to flow through battery 12 until its voltage is equal to A. Voltage A is substantially equivalent to that voltage representing a fully charged state of battery 14 with the charging current applied. When this voltage is reached, the voltage across coil 11 will be sufficient to actuate contacts 12 so as to energize coil 19 thereby opening contacts 18 and interrupting the flow of charging current.

Upon energization of coil 19, contacts 17 are also caused to close, so that an additional connection between coil 19 and source 10 is provided. By virtue of this connection being made with one of the contacts 17 associated with coil 19, it is seen that a well known holding or stick circuit is utilized to maintain coil 19 in an energized condition so long as switch 15 is closed. Since switch 15 remains closed for the duration of the cycle, charging of battery 14 will be discontinued until the end of the cycle. At this time, switch 15 momentarily opens, deenergizing coil 19 and also coil 11 if still energized, whereupon contacts 18 close and a new cycle is initiated. If for any reason source 10 should become inoperative, as from a power failure, for example, it will be observed that coil 19 will be immediately deenergized. Hence, charging will begin as soon as power is restored in order to insure that the battery is maintained in a charged condition as is most desirable.

Since the capacity of the battery 14, its voltage at fully charged state, and the rate at which the charging current is applied will affect the values to be assigned in the voltage-time characteristics 21, 22, no particular voltage designations have been given A or B. However, voltages A and B as well as the time interval $t_0$ to $t_1$ may be readily determined experimentally or from published data relative to the particular storage battery 14 to be charged. Once these values have been determined, it is apparent that coil 11 is not required to differentiate between such small voltage differences as those which need be significant in hitherto known devices. Fig. 3 illustrates that at time $t_1$ a relatively large voltage difference between curves 21 and 22 is present whereas at time $t_0$ the voltage difference is not nearly so large. It follows, therefore, that the "pull-in" voltage associated with coil 11 and contacts 12 need not be held to close tolerances which is also true of the "drop-out" voltage since the beginning of the charging operation is primarily controlled by time switch 15. Consequently, coil 11 and contacts 12 may comprise a relatively simple relay assembly so as to effect a substantial saving in cost over prior art devices where precision type relays are utilized. Time switches 15 and T⁰ will add very little to the cost of the apparatus since these items are relatively inexpensive as is well known.

Referring now to Fig. 2, there is shown an alternative arrangement of contacts 12 and 17 whereby coil 19 is coupled to battery 14 rather than to source 10. More particularly, contacts 12 and 17 are each connected between one leg of coil 19 and battery 14. The other leg of coil 19 is connected to battery 14 through switch 15 as before. In this arrangement, a mode of operation is provided which is particularly well suited for maintaining a charge in battery 14 even though the battery may be subject to considerable use. Thus when switch 15 momentarily opens and closes initiating a cycle, coils 19 and 11 will become deenergized, and contacts 18 will close to permit charging of the battery 14 to begin as before. Likewise, charging will continue until the battery voltage becomes equal to B within time $t_1$ or until the voltage is equal to A at some later time. When this occurs, contacts 12 close, energizing coil 19 which opens contacts 18 and closes contacts 17, the latter maintaining coil 19 energized so as to discontinue charging until the beginning of a new cycle. In the meanwhile, however, should battery 14 become discharged through use, so that its voltage decreases appreciably, contacts 18 will close causing charging current to flow immediately. This is because the low battery voltage will be insufficient to maintain coil 19 in an energized condition. When charge is restored to battery 14, charging will once again cease, however, since contacts 12 will close reconnecting coil 19 to battery 14. At this time the battery voltage will of course be sufficient to hold relay contacts 18 open until switch 15 momentarily opens, disconnecting coil 19 from the battery.

It being apparent that this invention is susceptible of many other variants within its spirit and scope,

What is claimed is:

1. Apparatus for controlling the flow of charging current through a battery in accordance with the state of charge of the battery, comprising: a voltage sensitive element to interrupt the flow of charging current in response to a predetermined amount of voltage; and means for applying the voltage of said battery to said element for a predetermined period of time commencing with the initial flow of said charging current, the voltage of said battery becoming equal to said predetermined amount of voltage within said period of time if said battery was substantially fully charged intially.

2. Apparatus for controlling the flow of charging current through a battery in accordance with the state of charge of the battery, comprising: a voltage sensitive element to interrupt the flow of charging current through the battery in response to a predetermined battery voltage; and means to increase the battery voltage required to actuate said voltage sensitive element and to interrupt the charging current after a predetermined period of time, said period of time commencing with the initial flow of said charging current.

3. Apparatus for controlling the flow of charging current through a battery in accordance with the state of charge of the battery, comprising: a voltage sensitive relay coupled to the battery; and means including a time operated switch coupled between said relay and the battery to decrease the amount of battery voltage impressed on said relay upon expiration of a predetermined period of time, said relay interrupting the flow of charging current when the battery voltage reaches a first predetermined amount within said predetermined period of time, and said relay interrupting the flow of charging current when the battery voltage reaches a second predetermined amount greater than said first predetermined amount after said predetermined period of time has expired.

4. Apparatus for controlling the flow of charging current through a battery in accordance with the stage of charge of the battery, comprising: a relay to interrupt the flow of charging current in response to a predetermined amount of voltage, said relay having a coil and at least one pair of contacts; means coupled between said coil and said battery to impress on said coil a portion of the voltage across said battery; means for decreasing the portion of the battery voltage impressed on said coil upon expiration of a predetermined period of time, the voltage impressed on said coil being sufficient to actuate said relay contacts and to interrupt the flow of said charging current when said battery is substantially fully charged.

5. Apparatus for controlling the flow of charging current through a battery in accordance with the state of charge of the battery, comprising: a voltage sensitive relay having a coil and at least one pair of contacts for controlling the flow of charging current, a resistor coupling said coil to said battery; and a time operated switch connected across said resistor, said switch being operative to open upon expiration of a predetermined period of charging time, thereby decreasing the voltage across said coil, said voltage being sufficient to actuate said relay contacts and to interrupt the flow of charging current only if said battery is substantially fully charged.

6. Apparatus for maintaining a battery in a substantially fully charged state comprising: means for applying a charging current to said batery at predetermined intervals of time; a voltage sensitive element to interrupt the flow of charging current through said battery in response to a predetermined amount of voltage; and means for impressing on said element for a predetermined period of charging time a voltage representing the battery voltage, said battery voltage causing said voltage sensitive element to interrupt the flow of charging current within said period of time if said battery was initially substantially fully charged.

7. Apparatus for maintaining a battery in a substantially fully charged state comprising: means for applying a charging current to said battery at predetermined intervals of time; a voltage sensitive element to interrupt the flow of charging current through said battery in response to a predetermined amount of voltage; means for impressing on said element for a predetermined period of charging time a portion of the battery voltage; and means for decreasing upon expiration of said period of time the portion of the battery voltage impressed on said element.

8. Apparatus according to claim 7 wherein said voltage sensitive element comprises a control relay having at least one pair of contacts; and wherein said apparatus includes an auxiliary relay having a coil and at least one pair of contacts, said coil being coupled to said first named means through the contacts of said control relay, and the contacts of said auxiliary relay being connected between said first named means and the battery.

9. Apparatus according to claim 8 wherein said auxiliary relay includes another pair of contacts coupled across the contacts of said control relay.

10. Apparatus according to claim 7 wherein said voltage sensitive element comprises a control relay having at least one pair of contacts; and wherein said apparatus includes an auxiliary relay having a coil and at least one pair of contacts, said coil being coupled to said battery through the contacts of said control relay, and the contacts of said auxiliary relay being connected between said first named means and the battery.

11. Apparatus according to claim 10 wherein said auxiliary relay includes another pair of contacts connected in a parallel relation with the contacts of said control relay.

References Cited in the file of this patent

UNITED STATES PATENTS

| | | |
|---|---|---|
| 1,577,028 | Horton | Mar. 16, 1926 |
| 1,710,542 | Landis | Apr. 23, 1929 |
| 2,307,576 | De Croce | Jan. 5, 1943 |